April 5 1932.  N. M. SARACENO  1,852,981
NONTIPPING FINGER BOWL
Filed Aug. 4, 1931
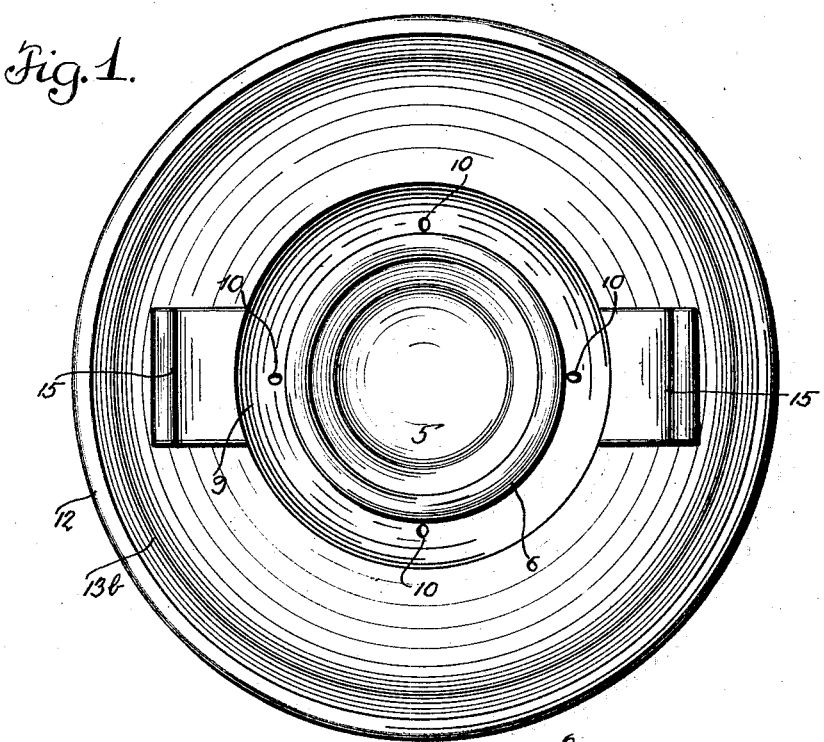
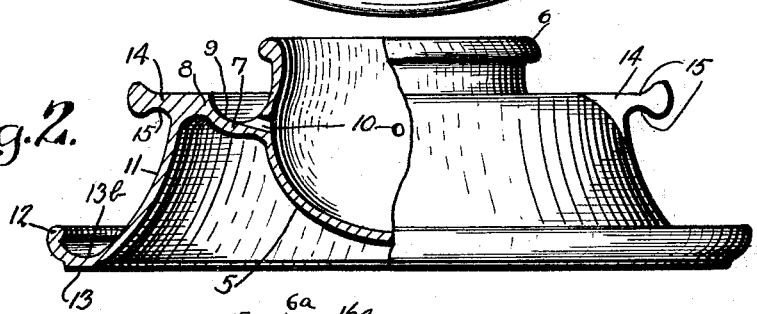
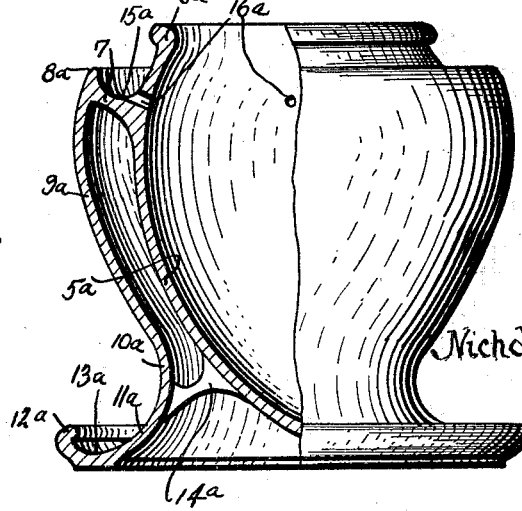
Inventor
Nicholas M. Saraceno.
by
Bryant & Lowry
Attorneys Patented Apr. 5, 1932

1,852,981

UNITED STATES PATENT OFFICE

NICHOLAS M. SARACENO, OF HARTFORD, CONNECTICUT, ASSIGNOR OF ONE-FOURTH TO JAN P. CLARY, OF HARTFORD, CONNECTICUT

NONTIPPING FINGER BOWL

Application filed August 4, 1931. Serial No. 555,127.

This invention relates to non-tipping finger bowls, particularly adapted for manicurists' use.

The primary object of this invention, is to provide a finger bowl having a large base area to prevent the bowl from tipping should the same be accidentally struck or jarred.

A further object of this invention, is to provide a finger bowl of the above mentioned character having an annular recess portion on the outside thereof to collect drippings which are drained back into the bowl.

A still further object of this invention, is to provide a manicurist's bowl or the like which may be easily molded or shaped.

Other objects and advantages of the invention will become apparent during the course of the following description forming a part of the specification and in which, Figure 1 is a top elevation of the invention illustrating the formation of the bowl and the drip catcher;

Figure 2 is a side elevation partly broken away in cross-section, to illustrate the construction; and Figure 3 is a modified form of the invention as applied to a vase or jar.

In the drawings, wherein is shown a preferred embodiment of the invention and wherein like reference characters will be employed to designate like parts throughout the same, the reference character 5 in Figs. 1 and 2 will generally be employed to designate a cup-shaped bowl having a rounded bottom and an open upper end terminating in a beaded portion 6.

Formed integral with the side wall of the bowl is an annular flanged portion 7 arcuately curved in cross-section and extending upwardly at the outer end thereof as at 8 to form a channel way or drip collecting chamber 9. The drip chamber 9 is connected with the interior of the bowl 5 by means of ports or passageways 10 for allowing the collection of drippings in the channelway 9 to drain back to the interior of the bowl 5.

Formed integral with the outer edge of the annular flange 7 is a downwardly and outwardly flaring face 11 terminating in an annular rolled bead portion 12 and having an annular flat portion 13 on the bottom thereof so that the base may be positioned on a flat surface without causing mars or scratches thereon.

Formed on opposite sides of the flanged portion 8 is a pair of handles 14 formed integral with the portion 8 and having opposite top and bottom inwardly curved portions 15 in order that the bowl may be grasped easily between the fingers of the user when moving the bowl from different locations upon the table or other surface where the device is used.

Attention is now directed to Figure 3 wherein is shown the invention as applied to a vase or jardinière and the invention comprises a cup-shaped bowl or vase portion 5a similar to the cup-shaped bowl 5 shown in Figs. 1 and 2. It will be noted that the vase 5a is deeper and is provided with a similar open end and terminating in a beaded portion 6a. Adjacent the beaded portion of the vase 6a is provided an outwardly and upwardly extending flanged portion 7a to form a drip channelway around the entire outer wall of the vase. The outwardly and upwardly extending flange 7a terminates as at 8a and at which point there is connected a base member 9a which extends downwardly and flares inwardly in an inverted cone-shaped relation until a point nearly to the bottom thereof as at 10a whereupon the base portion flares outwardly as at 11a and terminates in a beaded portion at 12a, thereby providing a further drip channelway 13a similar to the drip channelway 13b, shown in Figures 1 and 2.

It will be noted in Figure 3, that the curved wall 5a of the vase is spaced from the outer base portion 9a and if desired, a plurality of spacing devices or struts 14a may connect the outer wall of the vase 5a with the interior wall of the vase portion adjacent the curved section 10a at the point of its outward flare.

A drip channelway 15a is formed by the outwardly and upwardly extending flange 7a similar to the drip channelway 9 and suitable ports angularly disposed are formed in the base connecting the channelway 15a so that liquid or the like collected in the channelway may be drained back to the interior of the vase 5a. The ports are designated by the reference character 16a.

The operation of the device is quite obvious and it has been found in practice that by providing a second drip chamber or channelway as shown at 13a and 13b in the drawings, Figures 3 and 1 respectively, that a much better device is provided and may be used without losing or spilling a great deal of the material or fluid within the bowl or jar 5 and 5a.

It is to be understood, that the form of the invention herewith shown and described is to be taken as the preferred embodiment of the same and that various changes in the shape, size and arrangement of parts may be resorted to without departing from the spirit and scope of the invention as claimed.

I claim:—

1. A manicurist's bowl of the character described, comprising a cup-shaped bowl, an outwardly and upwardly extending flange on the outer periphery of the bowl, adjacent the open end thereof, angular ports connecting the interior of the bowl to the lowermost portion of the annular flange and a downwardly and outwardly extending base member connected to the outer portion of the annular flange, extending downwardly below the bottom of the bowl.

2. A manicurist's bowl of the character described, having an outwardly and upwardly extending annular flange on the outside thereof adjacent the open end of the bowl to form a drip channelway and ports connecting the bottom of the channelway to the interior of the bowl.

3. A manicurist's bowl of the character described, comprising a cup-shaped receptacle, an outwardly and upwardly extending flange on the outside wall thereof adjacent the top, said channelway having ports connecting to the interior of the bowl, said ports being below the bottom of the drip channelway to cause the drippings to drain back to the bowl and a base secured to the outer edge of the upwardly and outwardly extending annular flange for supporting the bowl in spaced relation from the surface upon which it is placed.

4. A bowl or jar of the character described, comprising a cup-shaped receptacle having an open upper end, an annular flange formed adjacent the open end, said annular flange extending outwardly and upwardly to form a drip channelway, said channelway having ports connecting the same to the interior of the bowl and a base connected to the outer portion of the outwardly and upwardly extending flange to support the bowl in spaced relation from the surface on which the device is placed.

5. A bowl or jar of the character described, comprising a cup-shaped receptacle having an open upper end, an outwardly and upwardly extending flange on the outside of the bowl adjacent the top thereof to form a drip channelway, said drip channelway having ports connecting the same to the interior of the bowl, whereby drippings collected therein will be drained back to the bowl, a downwardly and outwardly extending base portion formed integral with the annular flange and opposite handles formed integral with the base portion at a point adjacent the termination of the outwardly and upwardly extending flange.

6. A bowl or jar of the character described, comprising a cup-shaped receptacle having an open upper end, an annular outwardly and upwardly extending flange formed on the outside of the receptacle adjacent the top, said flange forming a channelway for receiving drippings from the bowl and having ports for connecting the channelway to the interior thereof whereby drippings collected in the channelway may be drained back into the bowl, an annular flange formed integral with the outwardly and upwardly extending flange, said annular flange extending downwardly and outwardly to form a base for the bowl to support the same in spaced relation from the surface upon which it is placed and opposite finger holds secured to the device at the juncture of the outwardly and upwardly extending flange and the downwardly and outwardly extending base.

In testimony whereof I affix my signature.

NICHOLAS M. SARACENO.